UNITED STATES PATENT OFFICE.

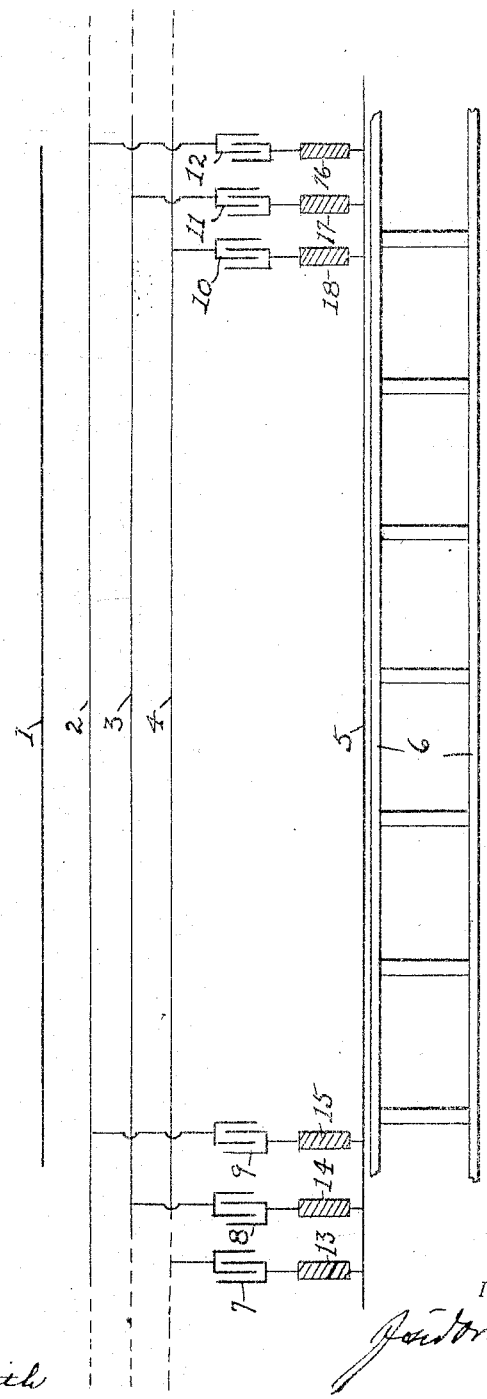

ISIDOR KITSEE, OF PHILADELPHIA, PENNSYLVANIA.

ELECTRIC TRANSMISSION OF INTELLIGENCE.

No. 883,723.      Specification of Letters Patent.      Patented April 7, 1908.

Application filed July 12, 1907. Serial No. 383,541.

*To all whom it may concern:*

Be it known that I, ISIDOR KITSEE, citizen of the United States, residing at Philadelphia, in the county of Philadelphia and State of Pennsylvania, have invented certain new and useful Improvements in Electric Transmission of Intelligence, of which the following is a specification.

My invention relates to an improvement in the electric transmission of intelligence. Its object is, to neutralize the impulses induced in lines of transmission from neighboring wires.

The drawing represents in diagrammatic view lines of transmission, an inducing line and means to neutralize the impulses induced in said transmitting lines.

I have illustrated this, my invention, as being applied to lines of transmission in the inducing region of a power wire used for electric propulsion and I have, therefore, illustrated the return as to consist of the rails of travel.

In this drawing, 1 is the power wire; 6 the rails of travel. These rails of travel act as the return. I have not illustrated the connection of the generator as to the wire 1 or to the rail 6, as such connection is well understood, but it is supposed that these rails 6 act as the return of the wire 1.

2, 3 and 4 are lines of transmission, either telegraphic or telephonic. In proximity to the rail 6 is the conductor 5. This conductor may consist of an insulated wire buried or placed otherwise near said rail, so as to be in the inductive field of same. The line 2 is connected here with the interposition of condenser 9 and inductive resistance 15 on one side and through condenser 12 and inductive resistance 16 on the other side, with wire 5. The line 3 is connected through condenser 8 and inductive resistance 14 and condenser 11 and inductive resistance 17, to wire 5. The line 4 is connected to wire 5 through condensers 7 and 10 and inductive resistances 13 and 18.

When, through the flow of an alternating or phase current, an impulse is induced in lines 2, 3 or 4, an impulse flowing in the opposite direction is simultaneously induced in wire 5. This impulse is of a direction opposite from the direction of the impulse induced in the lines 2, 3 or 4, and if the lines are connected to the wire 5, the impulse therein induced will be neutralized by the impulse induced in 5, but as the impulses in any of the lines of transmission are not of a like intensity—as the same are not in a like relation to the wire 1—, it is obvious that means should be provided, so as to regulate the flow of the impulses from 5 to any of these lines of transmission, and I have shown the condensers and inductive resistance as such means.

In the practical operation of this system, the condenser as well as the inductive resistance, should have means so as to vary their value. The person in charge when connecting one or the other of the lines to the wire 5, should adjust the capacity of the condenser and resistance of the inductance, so that the impulse from 5 should be just sufficient to neutralize the impulse induced in the line from the power wire proper.

It is well known that in practice the lines of transmission, that is, the telegraphic or telephonic wires, are carried further than the power wires and it is only necessary to counter-balance, so to speak, the inducing effect of these lines for the distance that they are in the region of these power wires.

Having now described my invention, what I claim as new and desire to secure by Letters Patent is:—

1. Means to neutralize impulses induced in lines of transmission from neighboring wires, said means comprising a conductor in inductive relation to the return of said wires and adjustable means to connect said conductor to two or more of said lines of transmission.

2. A series of lines of transmission, a common conductor for same, and means to connect said lines of transmission to said common conductor, the lines of transmission in the inducing field of a power wire and the common conductor in the inducing field of the return for said power wire.

3. In combination with one or more lines of transmission, positioned in the inducing region of a power wire, means to neutralize the inducing effect of said power wire, said means comprising a shunt for part of said lines of transmission, the shunt-wire in the inducing region of the return for said power wire.

In testimony whereof I affix my signature in presence of two witnesses.

ISIDOR KITSEE.

Witnesses:
     MARY C. SMITH,
     EDITH R. STILLEY.